United States Patent
Tunhag et al.

(10) Patent No.: US 9,878,720 B2
(45) Date of Patent: Jan. 30, 2018

(54) CONTROL OF A REQUESTED TORQUE IN A VEHICLE

(71) Applicant: SCANIA CV AB, Södertälje (SE)

(72) Inventors: Johan Tunhag, Södertälje (SE); Niclas Lerede, Södertälje (SE); Martin Evaldsson, Nacka (SE)

(73) Assignee: SCANIA CV AB, Södertälje (SE)

( * ) Notice: Subject to any disclaimer, the term of this patent is extended or adjusted under 35 U.S.C. 154(b) by 0 days.

(21) Appl. No.: 14/761,903

(22) PCT Filed: Mar. 2, 2014

(86) PCT No.: PCT/SE2014/050131
§ 371 (c)(1),
(2) Date: Jul. 17, 2015

(87) PCT Pub. No.: WO2014/129953
PCT Pub. Date: Aug. 28, 2014

(65) Prior Publication Data
US 2015/0360694 A1    Dec. 17, 2015

(30) Foreign Application Priority Data
Feb. 20, 2013    (SE) ........................................ 1350204

(51) Int. Cl.
*B60W 30/20*    (2006.01)
*B60W 10/04*    (2006.01)
(Continued)

(52) U.S. Cl.
CPC ............ *B60W 30/20* (2013.01); *B60W 10/04* (2013.01); *F02D 11/105* (2013.01);
(Continued)

(58) Field of Classification Search
None
See application file for complete search history.

(56) References Cited

U.S. PATENT DOCUMENTS

2009/0033264 A1    2/2009  Falkenstein
2009/0093937 A1    4/2009  Lupo et al.
(Continued)

FOREIGN PATENT DOCUMENTS

DE    102008052435 A1    4/2010
GB    2262818 A         6/1993
(Continued)

OTHER PUBLICATIONS

International Search Report for PCT/SE2014/050131 dated Aug. 5, 2014.
(Continued)

*Primary Examiner* — Mussa A Shaawat
*Assistant Examiner* — Kyung Kim
(74) *Attorney, Agent, or Firm* — Moore & Van Allen PLLC; W. Kevin Ransom

(57) ABSTRACT

Disclosed is a system for regulation of torque demanded from a prime mover of a vehicle, which prime mover responds to the torque demanded by delivering a dynamic torque. This dynamic torque is related by a gear ratio to a dynamic wheel torque which a power train comprising the prime mover imparts to at least one tractive wheel of the vehicle. The system regulates the torque demanded in such a way that a difference between the torque demanded and the dynamic torque is actively limited by employing feedback of the dynamic torque at an earlier time. The torque demanded at a time (t) for the regulation is limited to a maximum value which exceeds the dynamic torque at an earlier time by an offset value. The torque demanded is continuously varied according to the dynamic torque, so that power train oscillations in the vehicle are reduced in number and/or magnitude.

19 Claims, 9 Drawing Sheets

Figure 1:
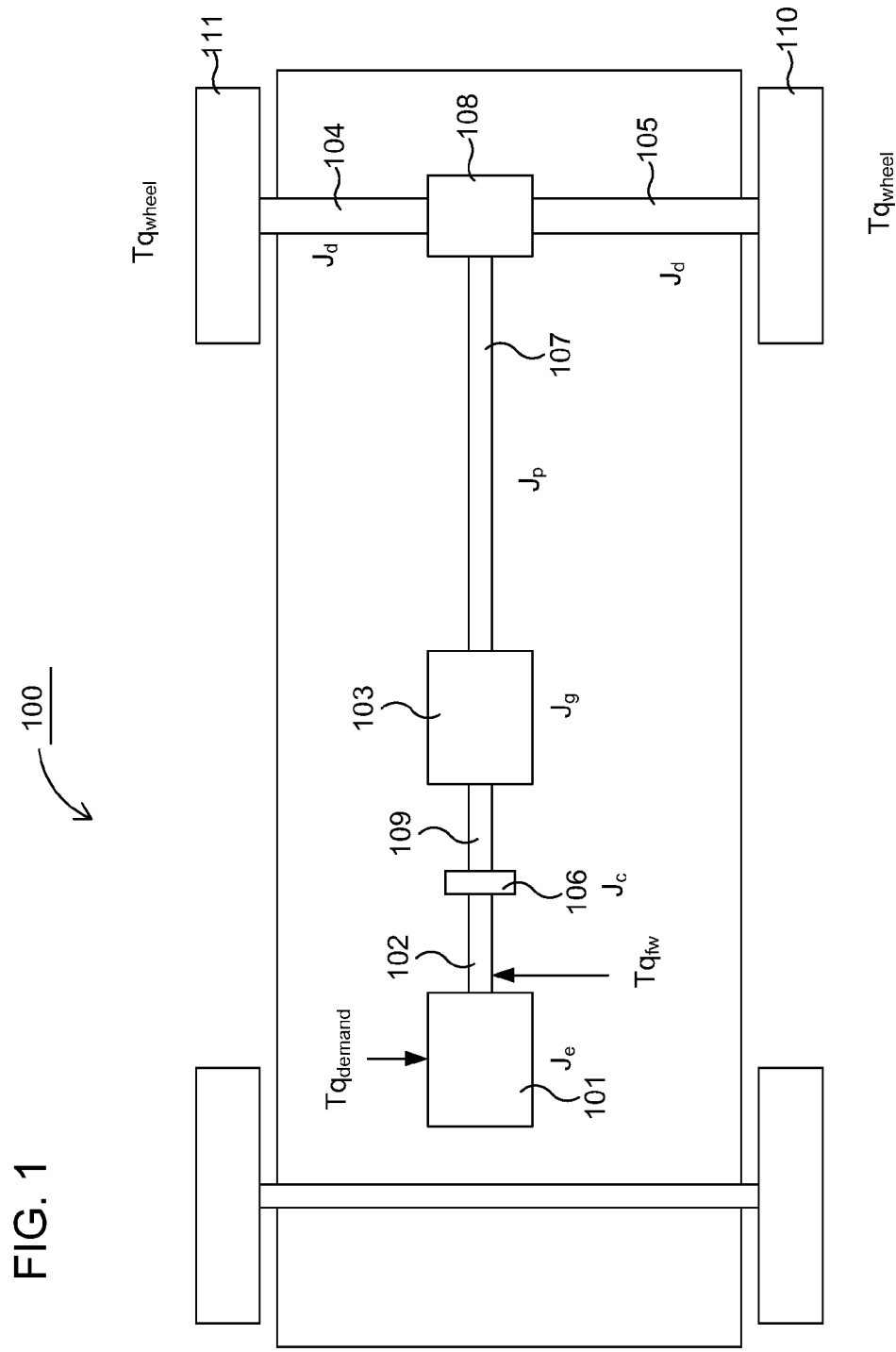

(51) Int. Cl.
  *F02D 41/02* (2006.01)
  *F02D 41/14* (2006.01)
  *F02D 11/10* (2006.01)
  *F02D 41/10* (2006.01)

(52) U.S. Cl.
  CPC ..... *F02D 41/0225* (2013.01); *F02D 41/1497* (2013.01); *F02D 41/10* (2013.01); *F02D 2200/1002* (2013.01); *F02D 2200/1004* (2013.01); *F02D 2200/1012* (2013.01); *F02D 2200/602* (2013.01); *F02D 2250/18* (2013.01); *F02D 2250/26* (2013.01); *F02D 2250/28* (2013.01)

(56) References Cited

U.S. PATENT DOCUMENTS

2009/0112427 A1* 4/2009 Heap ............. B60K 6/365
                                                 701/67

2012/0053770 A1   3/2012  Kretschmer et al.
2012/0101705 A1   4/2012  Templin
2012/0262102 A1  10/2012  Gee et al.

FOREIGN PATENT DOCUMENTS

WO      2005021315 A1    3/2005
WO      2009119228 A1   10/2009
WO   WO-2012115580 A1    8/2012

OTHER PUBLICATIONS

Baumann, Julian et. al, "Model-based predictive anti-jerk control", Control Engineering Practice, Pergamon Press, vol. 14, No. 3, pp. 259-266; Mar. 1, 2006, Oxford, GB.
Supplementary European Search Report for EP14754578 dated Oct. 7, 2016.
European Search Report for EP14754578.4 dated Nov. 2, 2016.

* cited by examiner

CONTROL OF A REQUESTED TORQUE IN A VEHICLE

CROSS REFERENCE TO RELATED APPLICATION(S)

This application claims priority to and is a national stage application of PCT Application No. PCT/SE2014/050131 filed Feb. 3, 2014 and claims priority to Swedish Application No: 1350204-2 filed Feb. 20, 2013; the contents of both of which are also incorporated herein by reference.

TECHNICAL FIELD

The present invention relates to regulation a torque demanded from a prime mover which responds to the torque demanded by delivering to its output shaft a dynamic torque related by a gear ratio to a dynamic wheel torque imparted by a power train comprising the prime mover to at least one tractive wheel of the vehicle.

BACKGROUND

The background description set out below represents a description of the background to the present invention but does not necessarily represent prior art.

Vehicles, e.g. cars, buses and trucks, are propelled by a driving torque delivered by a prime mover of the vehicle. This driving torque is conveyed to the vehicle's tractive wheels by a power train with which the vehicle is provided. The power train has a flexibility and a play which allow fluctuations of torque and/or rotation speed, so-called power train oscillations, to occur in the vehicle when for example it begins to move off after a demand for torque from the prime mover. These fluctuations in torque and/or rotation speed occur when forces built up in the power train between when the prime mover delivers the torque and when the vehicle begins to move are released when the vehicle moves off. The power train oscillations may cause the vehicle to rock in the longitudinal direction, as described in more detail below. This rocking of the vehicle is very disturbing for a driver of the vehicle.

Some previous known solutions for preventing these power train oscillations have therefore followed precautionary strategies with regard to the demanding of driving torque. When driving torque is demanded, such strategies may employ torque limiting ramps so configured that the driving torque demanded is limited such that the power train oscillations are reduced or do not occur at all.

BRIEF DESCRIPTION OF THE INVENTION

The torque ramps at present employed when driving torque is demanded thus involve a limitation of how torque may be demanded from the vehicle's prime mover. In today's known solutions this limitation is necessary to reduce the disturbing power train oscillations. With today's known systems, allowing the driver and/or for example a cruise control to freely demand torque would in many cases lead to significant and disturbing power train oscillations and consequent use of torque limiting ramps.

Today's torque limiting ramps are usually static. Static torque ramps are advantageous for their low complexity, which is one of the reasons for their being widely employed. They do however have a number of disadvantages related to not being optimized for all the operating situations which the vehicle may be subject to. In certain operating situations, static torque limiting ramps result in inferior vehicle performance, since the torque demanded on the basis of them will be unnecessarily small in situations where more driving torque could be demanded without causing power train oscillations. In other situations the torque ramp does not sufficiently limit the torque demanded, resulting in power train oscillations and consequent rocking of the vehicle. In certain operating situations, torque ramps thus do not result in optimized torque, potentially leading to unnecessarily inferior performance of the vehicle and/or uncomfortable rocking caused by power train oscillations.

An object of the present invention is to propose a method and a system for regulation of torque demanded $Tq_{demand}$ which solve the abovementioned problems with previous known estimations.

The present invention proposes a system adapted to regulation of torque demanded $Tq_{demand}$ from a prime mover of a vehicle which is adapted to responding to the torque demanded $Tq_{demand}$ by delivering a dynamic torque $Tq_{fw}$. This dynamic torque $Tq_{fw}$ is related by a gear ratio i to a dynamic wheel torque $Tq_{wheel}$ which a power train comprising the prime mover is adapted to imparting to at least one of the vehicle's tractive wheels. According to the present invention the system is adapted to conducting the regulation of the torque demanded $Tq_{demand}$ in such a way that a difference between the torque demanded $Tq_{demand}$ and the dynamic torque $Tq_{fw}$ is actively limited by employing feedback of the dynamic torque $Tq_{fw}(t-\Delta t)$ at an earlier time $t-\Delta t$. The torque demanded $Tq_{demand}$ at a time t for the regulation is here limited to a maximum value $Tq_{demand,max}$ which exceeds the dynamic torque $Tq_{fw}(t-\Delta t)$ at an earlier time $t-\Delta t$ by an offset value $Tq_{offset,max}$, i.e. $Tq_{demand,max}(t)=Tq_{fw}(t-\Delta t)+Tq_{offset,max}$. The torque demanded $Tq_{demand}$ is thus continuously varied according to the dynamic torque $Tq_{fw}$ so that the vehicle's power train oscillations are reduced in number and/or magnitude.

Employing the present invention causes the vehicle's power train to behave as if it was substantially rigid, since the present invention regulates the torque demanded $Tq_{demand}$ so that it is similar to the dynamic torque $Tq_{fw}$.

In other words, the present invention shapes the pattern of the torque demanded $Tq_{demand}$ according to the pattern of the dynamic torque $Tq_{fw}$, e.g. by employing feedback of the dynamic torque $Tq_{fw}$, with the result that during regulation according to the invention the power train feels rigid. Power train oscillations may thus be reduced in number and/or magnitude in numerous operating situations in which previous forms of regulation of the torque demanded $Tq_{demand}$ have resulted in problematic rocking of the vehicle. Such situations comprise commencement of demand for torque from the prime mover, so-called called "TIPIN", cessation of demand for torque from the prime mover, so-called "TIPOUT", play in the power train, a clutch or a gearchange, and situations where the control system is provided with incorrect reporting of driving torque, e.g. at the time of a gear change in the gearbox. In all these situations the present invention may counteract rocking of the vehicle caused by power train oscillations, with consequently better driver comfort. Power train oscillations due to external factors, e.g. potholes, may be quickly reduced and/or damped out with the present invention.

Employing the present invention also results in considerably less wear of the vehicle's power train. The wear reduction achieved by the invention results in longer service life for the power train, which is of course advantageous.

BRIEF LIST OF DRAWINGS

Figure 2:
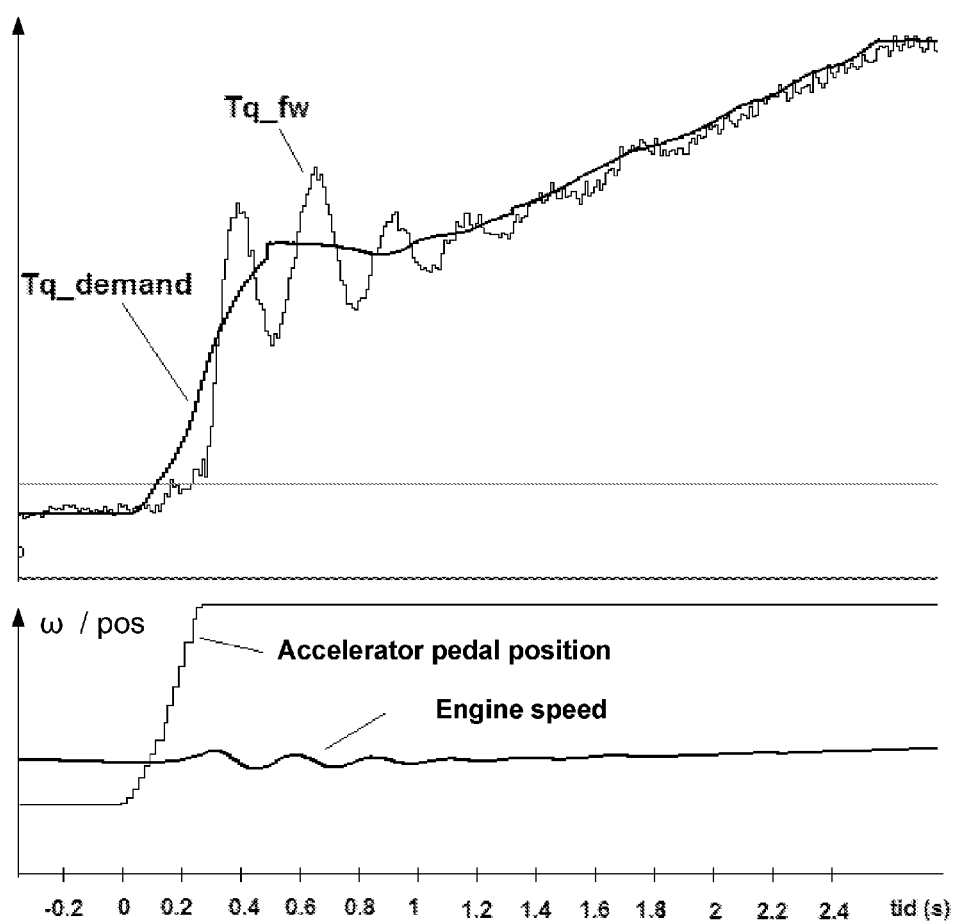
Figure 3:
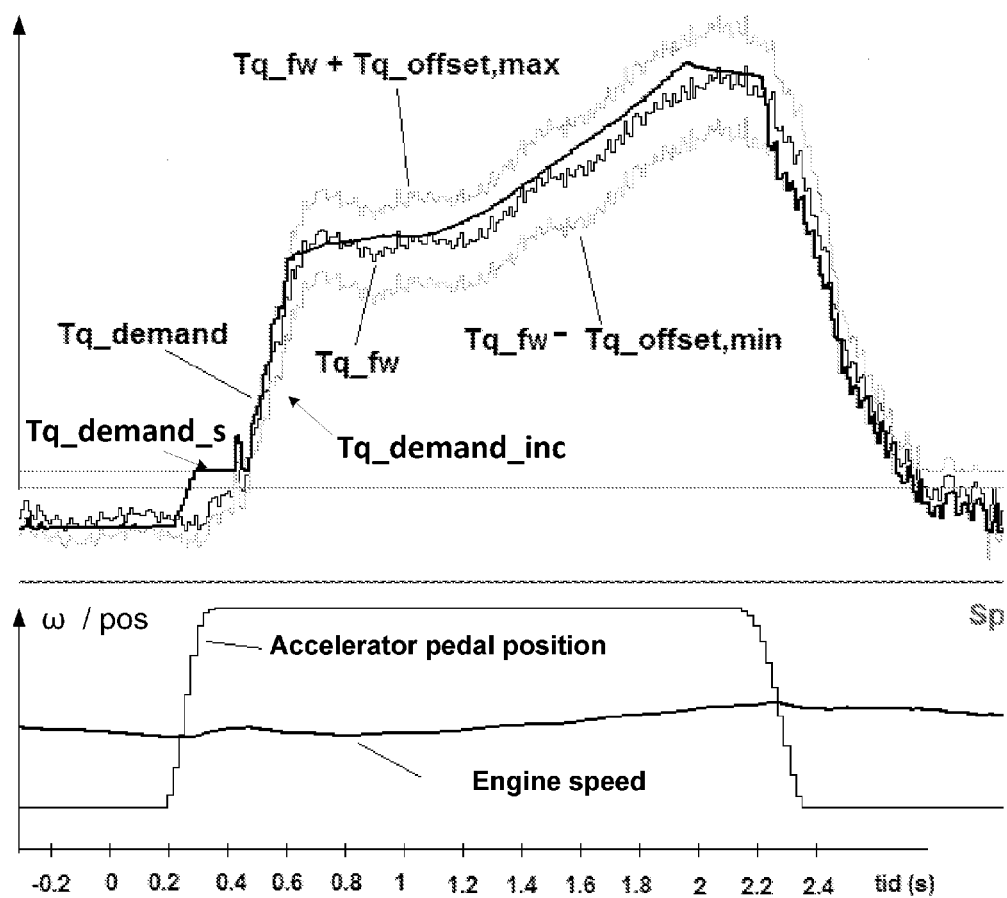
Figure 4:
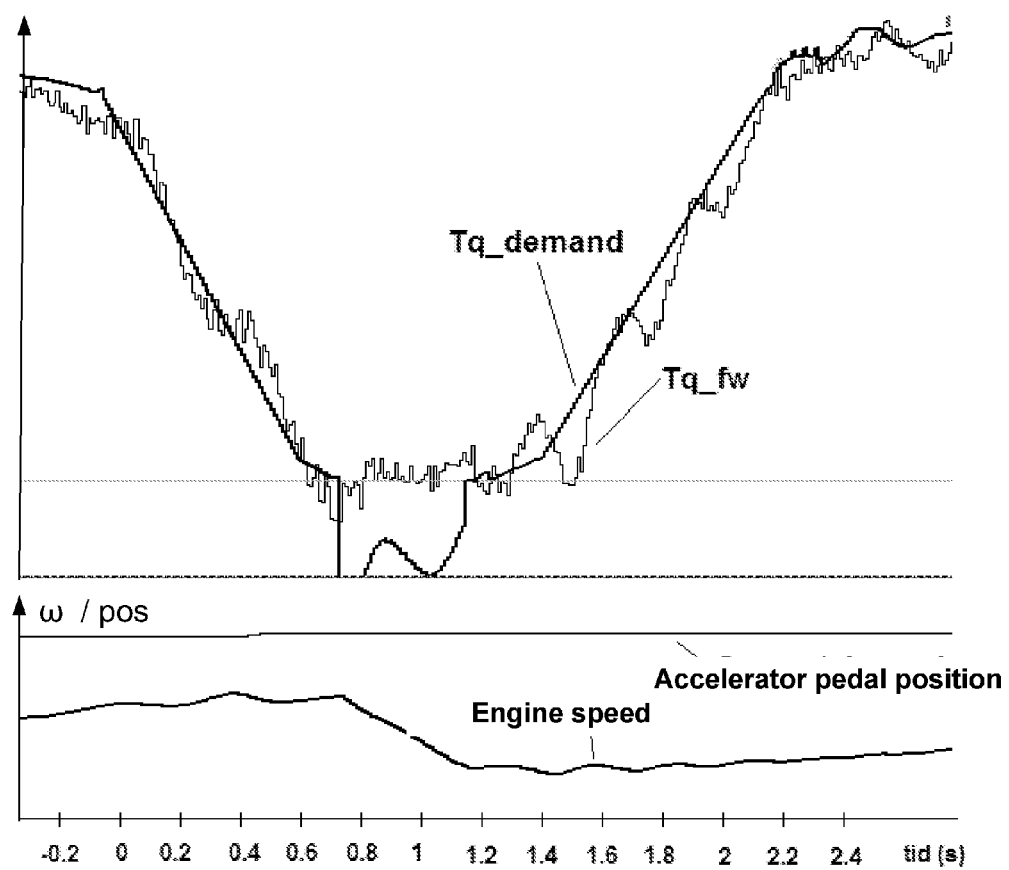
Figure 5:
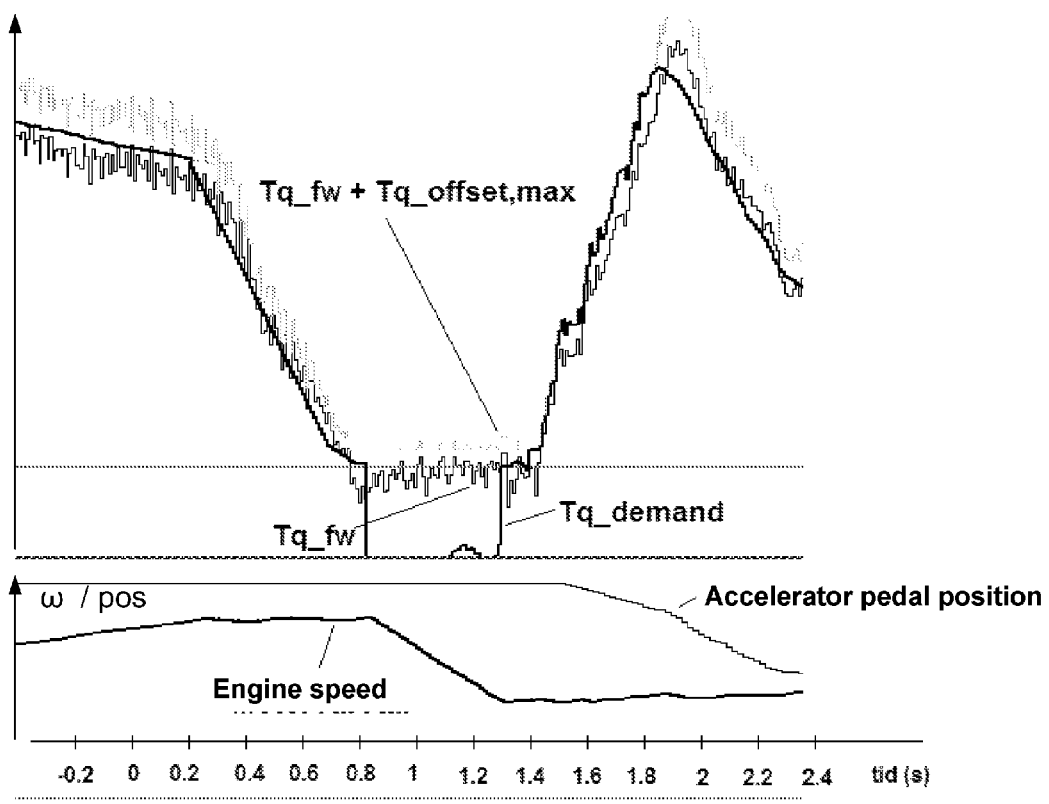
Figure 6:
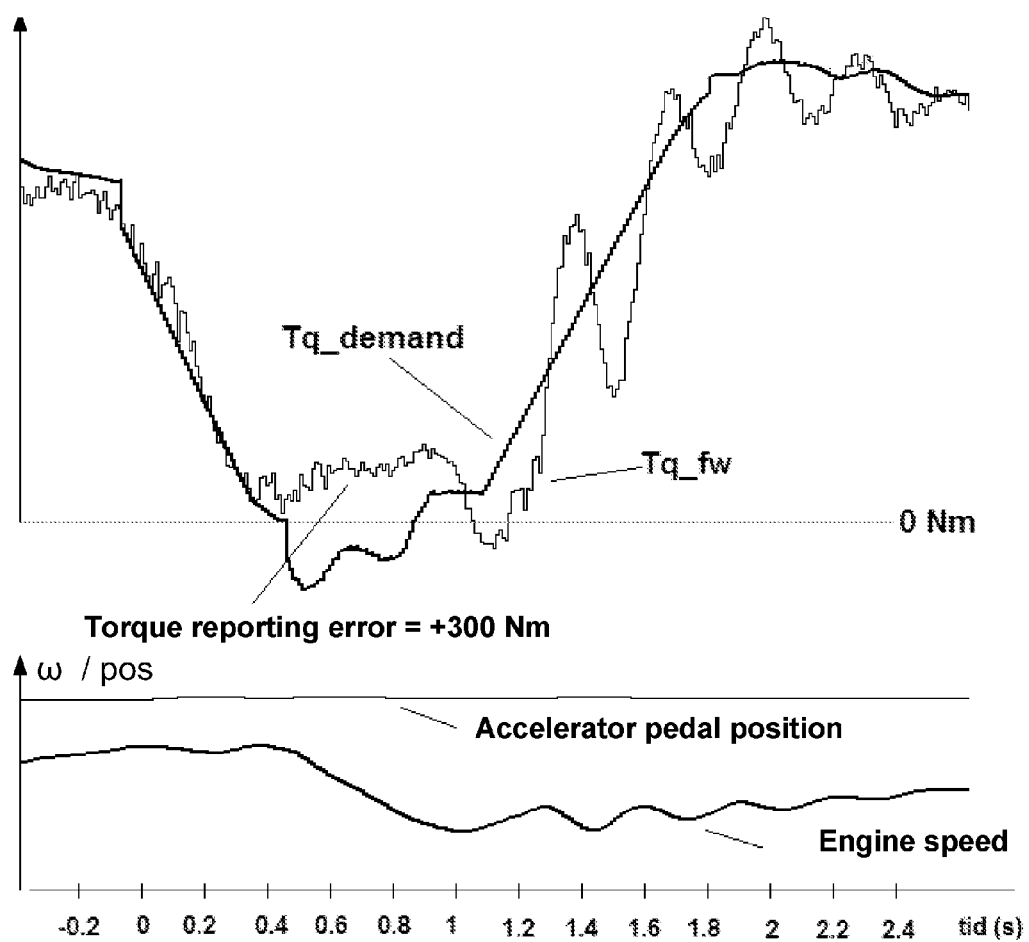
Figure 7:
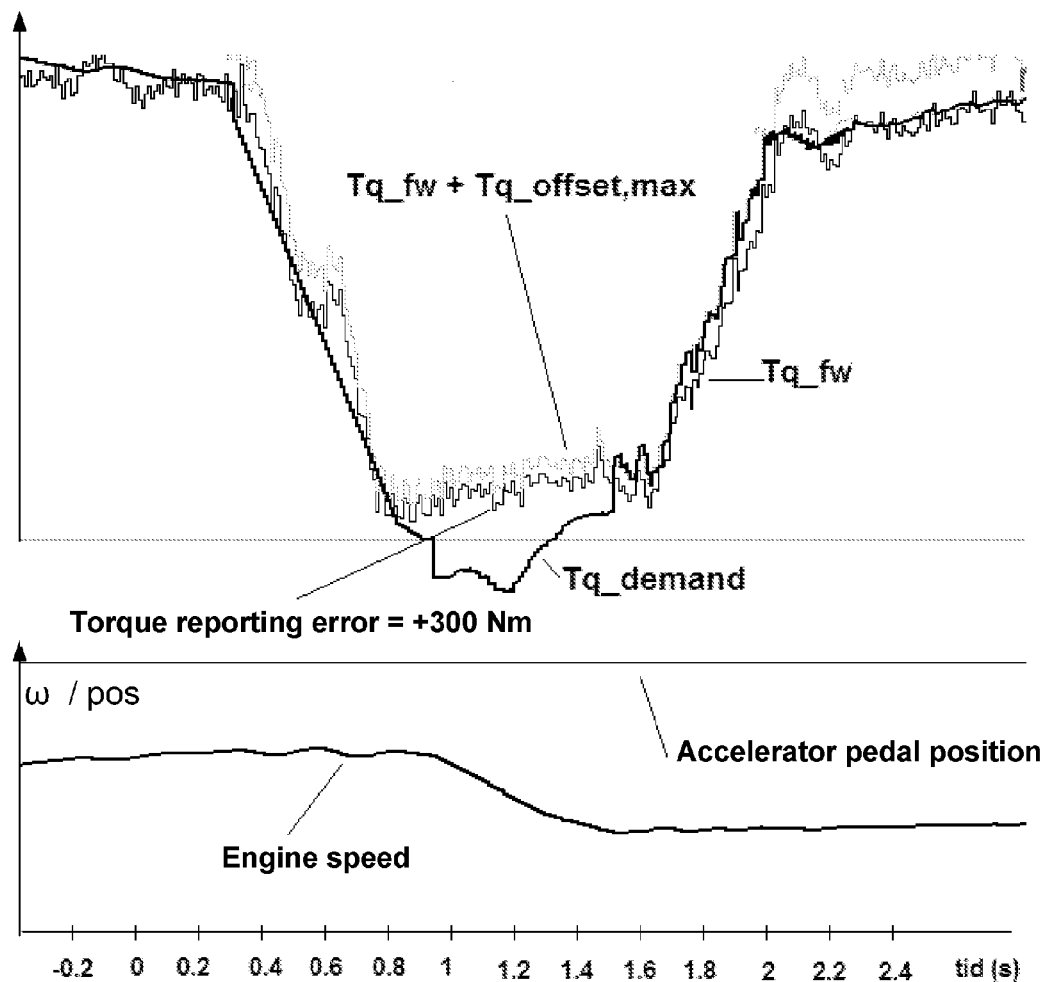
Figure 8:
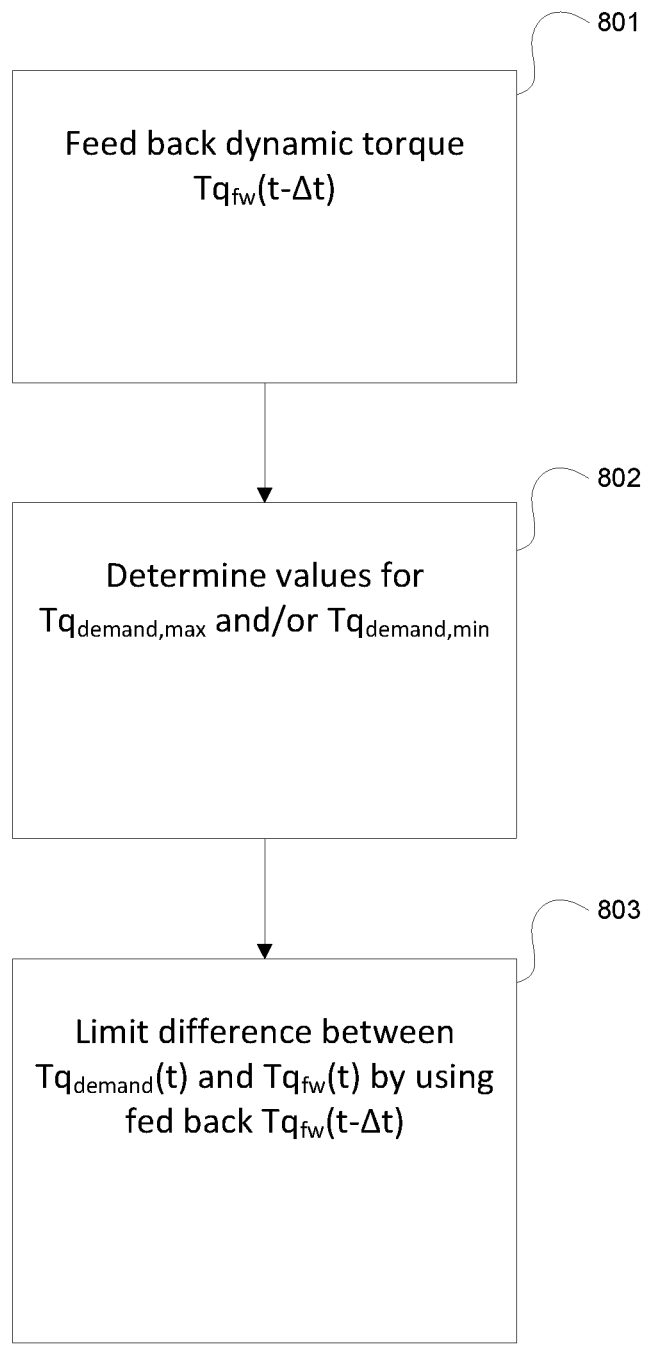
Figure 9:
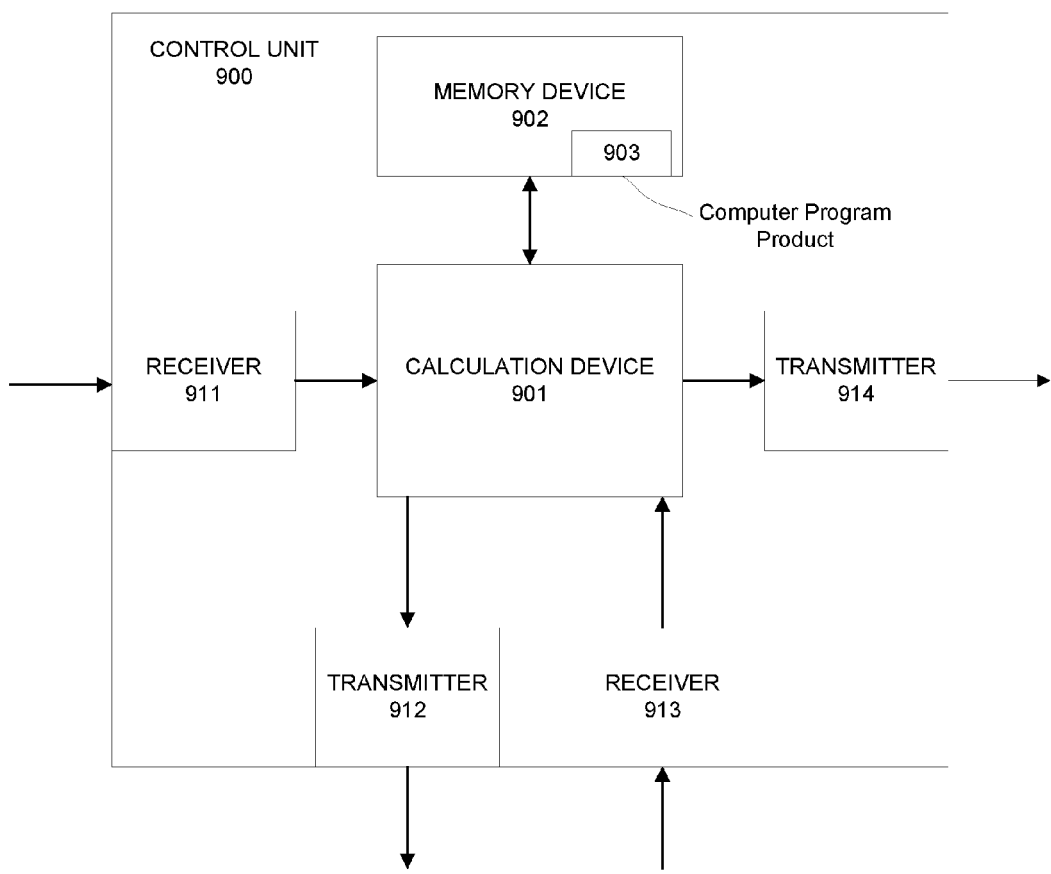

The invention is explained in more detail below with reference to the attached drawings, in which the same reference notations are used for similar items, and FIG. 1 depicts an example of a vehicle, FIG. 2 illustrates an operating situation in which a previous known form of regulation is applied, FIG. 3 illustrates an operating situation in which a form of regulation according to the invention is applied, FIG. 4 illustrates an operating situation in which a previous known form of regulation is applied, FIG. 5 illustrates an operating situation in which a form of regulation according to the invention is applied, FIG. 6 illustrates an operating situation in which a previous known form of regulation is applied, FIG. 7 illustrates an operating situation in which a form of regulation according to the invention is applied, FIG. 8 is a flowchart for a method according to an embodiment of the present invention, FIG. 9 depicts a control unit according to the present invention.

DESCRIPTION OF PREFERRED EMBODIMENTS

FIG. 1 depicts schematically an example of a heavy vehicle 100, e.g. a truck, bus or the like, which will be used to explain the present invention. The present invention is nevertheless not restricted to being used in heavy vehicles, as it may also be employed in lighter vehicles, e.g. cars. The vehicle 100 schematically depicted in FIG. 1 has one pair of tractive wheels 110, 111. It further comprises a power train with a prime mover 101 which may for example be a combustion engine, an electric motor or a combination of both, i.e. a so-called hybrid. The prime mover 101 may for example be connected in a conventional way, via an output shaft 102 from it, to a gearbox 103, possibly via a clutch 106 and an input shaft 109 of the gearbox. An output shaft 107 from the gearbox 103, also called the propeller shaft, drives the tractive wheels 110, 111 via a final gear 108, e.g. a conventional differential, and driveshafts 104, 105 which are connected to said final gear.

When a driver of the motor vehicle 100 increases a demand for torque from the prime mover 101, e.g. via an input means such as depressing an accelerator pedal, the result may be a relatively rapid change in the torque in the power train. This torque will be resisted by the tractive wheels 110, 111 owing to their friction on the ground and the vehicle's rolling resistance. The driveshafts 104, 105 will thus be subjected to a relatively powerful torque.

Partly for reasons of cost and weight, the driveshafts 104, 105 are not usually dimensioned to cope with this powerful stress without being affected, i.e. they have a relatively large amount of flexibility. The propeller shaft 107 may also have a relatively large amount of flexibility. Other components of the power train may also have some flexibility. The relative flexibility of the driveshafts 104, 105 means that they act instead like torsion springs between the tractive wheels 110, 111 and the final gear 108. In a similar way, the other flexibilities in the power train also act like torsion springs between the tractive wheels 110, 111 and the locations of the various components. When its rolling resistance is no longer sufficient to withstand the torque from the power train, the vehicle will begin to move, releasing the torsion spring force in the driveshafts 104, 105. When the vehicle moves off, this released force results in power train oscillations which cause it to rock in the longitudinal direction, i.e. in its direction of movement. This rocking is very unpleasant for a driver of the vehicle. Smooth and pleasant running is desirable for a driver and will also tend to make him/her feel that the vehicle is a refined and well-developed product. Unpleasant power train fluctuations therefore need if possible to be prevented.

The present invention relates to regulation of torque demanded $Tq_{demand}$ from the prime mover 101. The prime mover responds to a torque demanded of it, $Tq_{demand}$, by delivering a dynamic torque $Tq_{fw}$ which is the torque at the flywheel which connects the prime mover to its output shaft 102. This dynamic torque $Tq_{fw}$ is related by a gear ratio i of the power train to a dynamic wheel torque $Tq_{wheel}$ which is imparted to the vehicle's tractive wheels 110, 111. The gear ratio i takes the form here of the power train's total gear ratio, comprising the gearbox ratio for a current gear. In other words, a torque demanded $Tq_{demand}$ results in a dynamic wheel torque $Tq_{wheel}$ at the tractive wheels 110, 111.

According to the present invention the regulation of the torque demanded $Tq_{demand}$ is conducted in such a way that a difference between the torque $Tq_{demand}$ demanded from the prime mover 101 and the dynamic torque $Tq_{fw}$ imparted from the prime mover is actively limited by employing feedback of the dynamic torque $Tq_{fw}(t-\Delta t)$ at an earlier time $t-\Delta t$. The torque demanded $Tq_{demand}$ at a time t for the regulation is here limited to a maximum value $Tq_{demand,max}$ which exceeds the dynamic torque $Tq_{fw}(t-\Delta t)$ at an earlier time $t-\Delta t$ by an offset value $Tq_{offset,max}$, i.e. $Tq_{demand,max}(t)=Tq_{fw}(t-\Delta t)+Tq_{offset,max}$. This limitation of the difference means that the regulation of the torque demanded $Tq_{demand}$ is continually varied according to the dynamic torque $Tq_{fw}$ actually imparted by the prime mover in response to the torque demanded $Tq_{demand}$. This means that during the regulation of the torque demanded $Tq_{demand}$ according to the invention the power train behaves as if it was more rigid than it actually is. This means that the power train oscillations can be greatly reduced when the present invention is employed in regulating the torque demanded $Tq_{demand}$.

The present invention thus achieves a form of regulation of the torque demanded $Tq_{demand}$ which improves the vehicle's performance and/or driver comfort, by making it easy to determine for the torque demanded $Tq_{demand}$ a value which is optimized from the performance perspective and does not result in rocking of the vehicle.

If regulation according to the present invention causes the difference between the torque demanded $Tq_{demand}$ and the dynamic torque $Tq_{fw}$ to become small enough, the power train will behave like a substantially rigid power train. The dynamic torque $Tq_{fw}$ delivered by the prime mover 101 to its output shaft 102 may in one embodiment be determined on the basis of torque demanded $Tq_{demand}$ and the prime mover's rotational inertia $J_e$ and rotational acceleration $\dot{\omega}_e$. The dynamic torque $Tq_{fw}$ may here be determined as a difference between estimated values for torque demanded $Tq_{demand}$ and torque values $J_e\dot{\omega}_e$ comprising measured values for the prime mover's rotational acceleration $\dot{\omega}_e$. In one embodiment the dynamic torque $Tq_{fw}$ may therefore be represented by a signal expressing the difference between a signal for an estimated torque demanded $Tq_{demand}$ and a torque signal $J_e\dot{\omega}_e$ comprising measured values for the prime mover's rotational acceleration $\dot{\omega}_e$.

In one embodiment of the present invention the driving torque demanded $Tq_{demand}$ takes the form of a delayed driving torque demanded $Tq_{demand\_delay}$, which is delayed by a time $T_{inj}$ which an injection of fuel in the engine 101 takes. This injection time $T_{inj}$ is typically known, but its length varies, for example, from engine to engine and/or at different speeds of a given engine.

The driving torque demanded $Tq_{demand}$ and the delayed driving torque demanded $Tq_{demand\_delay}$ may in one embodiment be defined as a net torque, i.e. with losses and/or frictions compensated for, thus arriving at a net driving torque demanded and a delayed driving torque demanded.

The dynamic torque $Tq_{fw}$ delivered by the prime mover 101 to its output shaft 102 thus corresponds in one embodiment to the torque demanded $Tq_{demand}$ minus a torque corresponding to the prime mover's rotational inertia $J_e$ multiplied by a rotational acceleration $\dot{\omega}_e$ for the prime mover, i.e. $Tq_{fw}=Tq_{demand}-J_e\dot{\omega}_e$, in which the driving torque demanded $Tq_{demand}$ may take the form of a delayed driving torque demanded $Tq_{demand\_delay}$ which is delayed by the injection time $T_{inj}$.

The rotational acceleration $\dot{\omega}_e$ for the prime mover 101 may here be measured by a time derivative of the engine/motor speed $\omega_e$. The rotational acceleration $\dot{\omega}_e$ is then rescaled to a torque according to Newton's second law by being multiplied by the rotational inertia torque $J_e$ for the prime mover, i.e. to $J_e\dot{\omega}_e$.

In another embodiment the dynamic torque $Tq_{fw}$, delivered by the prime mover 101 may also be determined by using a torque sensor situated at any suitable point along the vehicle's power train. A torque value measured by such a sensor may therefore also be employed in the feedback according to the present invention. Such a measured torque arrived at by means of a torque sensor after the flywheel, i.e. somewhere between the flywheel and the tractive wheels, corresponds to the physical torque in the form of the dynamic driving torque $Tq_{fw}$. If good torque reporting can be achieved by using such a torque sensor, the sensor should provide a torque signal representing the dynamic torque $Tq_{fw}$.

As illustrated in FIG. 1, the various parts of the power train have different rotational inertias, comprising a rotational inertia $J_e$ for the prime mover 101, a rotational inertia $J_g$ for the gearbox 103, a rotational inertia $J_c$ for the clutch 106, a rotational inertia $J_p$ for the propeller shaft and rotational inertias $J_d$ for the respective driveshafts 104, 105. Generally speaking, all rotating bodies have a rotational inertia J which depends on their weight and how far it is from the centre of rotation. For the sake of clarity, FIG. 1 shows only the rotational inertias listed above, and their significance for the present invention will be described below. One skilled in the art will appreciate that more moments of inertia than those listed here may occur in a power train.

One embodiment of the present invention makes the assumption that the rotational inertia $J_e$ of the prime mover 101 is much greater than the other rotational inertias in the power train and that it therefore dominates a total rotational inertia $J_{dl}$ of the power train. In other words, $J_{dl}=J_e+J_g+J_c+J_p+2J_d$, but when $J_e>>J_g$, $J_e>>J_c$, $J_e>>J_p$, $J_e>>J_d$ the total rotational inertia $J_{dl}$ of the power train will be approximately equal to the rotational inertia $J_e$ of the prime mover, i.e. $J_{dl}\approx J_e$. Non-limitative examples of values which may be cited for these rotational inertias are $J_e=4$ kgm$^2$, $J_g=0.2$ kgm$^2$, $J_c=0.1$ kgm$^2$, $J_p=7*10^{-4}$ kgm$^2$, $J_d=5*10^{-5}$ kgm$^2$, which means that the assumption that the rotational inertia $J_e$ of the prime mover dominates the total rotational inertia $J_{dl}$ of the power train, i.e. $j_{dl}\approx J_e$, holds good, since the other parts of the power train are much easier to rotate than the prime mover. The above examples are values on the engine/motor side of the gearbox, which means that they will vary along the power train depending on gear ratios employed. Irrespective of the gear ratio, the rotational inertia $J_e$ of the prime mover will be much greater than the other rotational inertias and will therefore dominate the total rotational inertia $J_{dl}$ of the power train.

When the prime mover's rotational inertia $J_e$ dominates the power train's total rotational inertia $J_{dl}$, i.e. $J_{dl}\approx J_e$, the dynamic wheel torque $Tq_{wheel}$ will correspond to the dynamic torque imparted from the prime mover $Tq_{fw}$ multiplied by the power train's gear ratio i, i.e. $Tq_{wheel}=Tq_{fw}$. This considerably simplifies the regulation of the torque demanded $Tq_{demand}$ according to the present invention by making it very easy to determine the dynamic torque $Tq_{wheel}$ at the wheels. Hence the regulation of the torque demanded $Tq_{demand}$ according to the invention can continually be varied adaptively according to the dynamic torque imparted to the wheels $Tq_{wheel}$, which means that power train oscillations can be reduced considerably or even be completely eliminated. Driving torque may then be demanded, $Tq_{demand}$, so that a desired dynamic torque $Tq_{wheel}$ is continually imparted to the wheels, which results in a uniform torque profile for their dynamic torque $Tq_{wheel}$ and means that fluctuations of their torque profile do not occur or are of considerably less amplitude than in previous known forms of regulation of driving torque demanded $Tq_{demand}$.

The present invention achieves the limitation according to the invention of the difference between the torque demanded $Tq_{demand}$ and the dynamic torque $Tq_{fw}$ by employing feedback of dynamic torque $Tq_{fw}$. Values fed back for the dynamic torque $Tq_{fw}$ imparted by the prime mover 101 are thus employed here in regulating the torque demanded $Tq_{demand}$. As the ratio between the dynamic wheel torque $Tq_{wheel}$ and the dynamic torque imparted by the prime mover $Tq_{fw}$ is known, i.e. $Tq_{wheel}=Tq_{fw}*i$, this feedback may also be regarded as being related to the dynamic wheel torque $Tq_{wheel}$. The feedback of the dynamic torque $Tq_{fw}$ thus makes it possible for the regulation of the torque demanded $Tq_{demand}$ to be continuously varied relative to the dynamic torque $Tq_{fw}$ and/or the dynamic wheel torque $Tq_{wheel}$ which is actually utilized by the vehicle, making it possible for the power train oscillations to be minimized as described above.

In one embodiment the feedback of the dynamic torque $Tq_{fw}$ takes place at a time t by feeding this dynamic torque $Tq_{fw}(t-\Delta t)$ back at an earlier time $t-\Delta t$, in which $\Delta t$ is a time step appropriate to the system, coupled for example to a calculation rate for the system.

In regulating the torque demanded $Tq_{demand}$ it is thus here possible at a time t for the torque demanded $Tq_{demand}$ to be limited to a maximum value $Tq_{demand,max}$ which exceeds the dynamic torque $Tq_{fw}(t-\Delta t)$ at an earlier time $t-\Delta t$ by an offset value $Tq_{offset,max}$, i.e. $Tq_{demand,max}(t)=Tq_{fw}(t-\Delta t)+Tq_{offset,max}$, in which $\Delta t$ as above is a time step appropriate to the system.

In a similar way, a minimum value $Tq_{demand,min}$ may also be demanded $Tq_{demand}$ at a time t for the regulation being limited to a minimum value $Tq_{demand,min}$ which is less than the dynamic torque $Tq_{fw}(t-\Delta t)$ at an earlier time $t-\Delta t$ by an offset value $Tq_{offset,min}$, i.e. $Tq_{demand,min}(t)=Tq_{fw}(t-\Delta t)-Tq_{offset,min}$, in which $\Delta t$ is the aforesaid time step appropriate to the system.

As the ratio between the dynamic wheel torque $Tq_{wheel}$ and the dynamic torque imparted by the prime mover, $Tq_{fw}$, is known, i.e. $Tq_{wheel}=Tq_{fw}*i$, the dynamic torque $Tq_{fw}(t-\Delta t)$ at the earlier time $t-\Delta t$ comprises also information related to the magnitude of the dynamic wheel torque $Tq_{wheel}(t-\Delta t)$ at this earlier time $t-\Delta t$. Just as mentioned above, the feedback of the dynamic torque $Tq_{fw}$ means that information related to the dynamic wheel torque $Tq_{wheel}$ is fed back and taken into account in regulating the torque demanded $Tq_{demand}$.

In one embodiment the magnitude of these offset values $Tq_{offset,max}, Tq_{offset,min}$, is variable and related to the vehicle's behavior, which may for example be coupled to an operating mode in such a way that the magnitude of the offset values $Tq_{offset,max}, Tq_{offset,min}$ is determined on the basis of an operating mode employed/chosen for the vehicle. Various such modes are defined for vehicles, e.g. an economical mode (ECO), a powerful mode (POWER) and a normal mode (NORMAL).

In another embodiment of the invention the magnitude of these offset values $Tq_{offset,max}, Tq_{offset,min}$ is instead constant and predetermined.

The dynamic torque $Tq_{fw}$ may be calculated as the torque demanded $Tq_{demand}$ minus the prime mover's rotational inertia $J_e$ multiplied by a rotational acceleration $\dot{\omega}_e$ for the prime mover, i.e. $Tq_{fw}=Tq_{demand}-J_e\dot{\omega}_e$ which applies generally for all types of prime movers, e.g. combustion engines and electric motors. When the feedback of the dynamic torque $Tq_{fw}$ is by feeding this dynamic torque $Tq_{fw}(t-\Delta t)$ back at an earlier time $t-\Delta t$, where $\Delta t$ is a time step appropriate to the system, the dynamic torque $Tq_{fw}(t-\Delta t)$ is determined at the earlier time $t-\Delta t$ on the basis of the torque demanded $Tq_{demand}(t-\Delta t)$ at the earlier time $t-\Delta t$ minus the prime mover's rotational inertia $J_e$ multiplied by a rotational acceleration for the prime mover $\dot{\omega}_e(t-\Delta t)$ at the earlier time $t-\Delta t$, i.e. $Tq_{fw}(t-\Delta t)=Tq_{demand}(t-\Delta t) J_e\dot{\omega}_e(t-\Delta t)$.

The torque demanded $Tq_{demand}(t-\Delta t)$ at the earlier time $t-\Delta t$ is here known, since it is the system itself which demands this torque at the earlier time $t-\Delta t$. The prime mover's rotational inertia $J_e$ has a known value, e.g. 4 $kgm^2$ for a certain type or model of engine/motor. The rotational acceleration for the prime mover $\dot{\omega}_e(t-\Delta t)$ at the earlier time $t-\Delta t$ is measured at the earlier time $t-\Delta t$, e.g. by a sensor on the flywheel providing an engine/motor speed signal which is then derived to arrive at the prime mover's rotational acceleration $\dot{\omega}_e(t-\Delta t)$.

As described above, the rotational inertia $J_e$ of the prime mover 101 is assumed in one embodiment to be much greater than the other rotational inertias in the power train, i.e. $J_e \gg J_g$, $J_e \gg J_c$, $J_e \gg J_p$, $J_e \gg J_d$. On this assumption the rotational inertia $J_e$ of the prime mover will dominate the power train's total rotational inertia $J_{dt}$, i.e. $J_{dt} \approx J_e$, since the other parts of the power train are much easier to rotate than the prime mover. When such is the case, the relationship between the dynamic wheel torque $Tq_{wheel}$ with the gear ratio i and the dynamic torque imparted by the prime mover $Tq_{fw}$ will be $Tq_{wheel}=Tq_{fw}*i$. This makes it easy to relate the dynamic torque imparted to the wheels to the dynamic torque imparted by the prime mover, $Tq_{fw}$.

In one embodiment of the present invention the difference between the torque demanded $Tq_{demand}$ and the dynamic torque $Tq_{fw}$ is used to determine a first measurement of the regulation of the torque demanded $Tq_{demand}$.

This first measurement may be determined by doing a sign-neutral summation of the difference over time, it being possible for example to achieve this sign neutrality by a summation of an absolute amount or summation of a square of the difference, which means that the sign of the difference for each individual term summated will not affect the result/value of the summation.

The magnitude of this first measurement may be related to how well the regulation of the torque demanded $Tq_{demand}$ works, in that a smaller value will represent a more successful regulation than a larger value. The first measurement may also be used to compare regulation according to the present invention with previous known forms of regulation. Such comparisons have shown that the present invention achieves considerably better regulation of the torque demanded $Tq_{demand}$ from a comfort perspective than previous known solutions.

The first measurement may also be used as a parameter in the actual regulation, by the regulation of the torque demanded $Tq_{demand}$ being conducted in such a way that the first measurement will be minimized. The regulation of the torque demanded $Tq_{demand}$ will thus be controlled in such a way that it becomes as similar to the dynamic torque $Tq_{fw}$ as possible, i.e. we configure the torque demanded $Tq_{demand}$ to be similar to the dynamic torque $Tq_{fw}$. This means that the power train will behave as if it was substantially rigid, thereby considerably reducing the incidence and magnitude of power train oscillations.

In one embodiment of the present invention a change time $t_{change}$ representing the time taken to effect a predetermined change in the dynamic torque $\Delta Tq_{fw}$, is used to determine a second measurement of the regulation of the torque demanded $Tq_{demand}$ In a similar way to the first measurement described above, the magnitude of the second measurement may be related to how well the regulation of the torque demanded $Tq_{demand}$ works. A smaller value of the second measurement will represent a more successful regulation than a larger value. The second measurement may also be used in combination with the first measurement, and may also be used to compare regulation according to the present invention with previous known forms of regulation.

Either individually or in combination with the first measurement, the second may also be used as a regulating parameter by the regulation of the torque demanded $Tq_{demand}$ being conducted in such a way that the second measurement will be minimized. This will result in the torque demanded $Tq_{demand}$ being as similar to the dynamic torque $Tq_{fw}$ as possible, which means that the power train will behave like a substantially rigid power train. With rigid power trains there are no power train oscillations.

Regulation of the torque demanded $Tq_{demand}$ according to the present invention may thus be employed to reduce the number and/or magnitude of power train oscillations in numerous operating situations where previous forms of regulation of the torque demanded $Tq_{demand}$ have resulted in problematical rocking of the vehicle. One such situation is at a commencement of demand for torque from the prime mover, a so-called "TIPIN". Another is at a cessation of demand for torque from the prime mover, a so-called "TIPOUT".

The present invention also reduces the power train oscillations in operating situations which involve play in the power train, e.g. when the teeth of two gearwheels in the gearbox do not mesh for a short period of time before subsequently meshing again, e.g. during a transition between dragging of the engine/motor and a demand for torque/power mobilisation, during activation of the clutch or during a gear change. The present invention may therefore also reduce power train oscillations in situations which involve activation of the clutch or a gear change in the gearbox.

The present invention may also counteract rocking and thereby improve comfort in operating situations where the control system receives incorrect reporting of driving torque, e.g. at the time of a gear change in the gearbox. The present invention may quickly damp out power train oscillations caused by external factors, e.g. potholes.

Some of these operating situations are illustrated below with reference to the drawings.

FIG. 2 illustrates the torque demanded $Tq_{demand}$, the dynamic torque $Tq_{fw}$, and the resulting engine/motor speed in a situation which involves a change in the position of an acceleration control. It shows the torque demanded $Tq_{demand}$ as regulated by previous known methods. One skilled in the art will appreciate that the curve depicted here and in the other drawings for the accelerator pedal position might also represent a curve for some other type of acceleration control of the vehicle or a curve for a reference speed demanded by a cruise control of the vehicle. It is clear from FIG. 2 that the torque demanded $Tq_{demand}$ and the dynamic torque $Tq_{fw}$ differ substantially at power mobilisation ("TIPIN"), since the dynamic torque $Tq_{fw}$ oscillates considerably more than the torque demanded $Tq_{demand}$, in the previous known solutions. The difference between the torque demanded $Tq_{demand}$ and the dynamic torque $Tq_{fw}$ causes the engine/motor speed to fluctuate as in the diagram, i.e. in the form of power train oscillations which will be perceived as a disturbing rocking of the vehicle.

FIG. 3 illustrates the torque demanded $Tq_{demand}$ in the embodiment described above where the torque demanded $Tq_{demand}$ at a time t is limited to a maximum value $Tq_{demand,max}$ and a minimum value $Tq_{demand,min}$ which are related to the dynamic torque at the earlier time $Tq_{fw}(t-\Delta t)$, i.e. $Tq_{fw}(t-\Delta t)-Tq_{offset,min}<Tq_{demand}(t)<Tq_{fw}(t-\Delta t)+Tq_{offset,max}$, allowing the torque demanded $Tq_{demand}$ to work within a range about the dynamic torque $Tq_{fw}$. For the sake of legibility, the time indications have been omitted from the designations of the curves in FIG. 3 (and in FIGS. 5 and 7), but one skilled in the art will appreciate that in these diagrams the term $Tq_{demand}(t)$ is the value of the $Tq_{demand}$ curve at the time t, that the term $Tq_{fw}(t-\Delta t)$ is the value of the Tq_fw curve at the earlier time $(t-\Delta t)$, and so on.

At power mobilisation ("TIPIN") the torque demanded $Tq_{demand}$ reaches the upper limit value $Tq_{demand,max}$, preventing the torque demanded $Tq_{demand}$ from increasing further, and at the end of power mobilisation ("TIPOUT") the torque demanded $Tq_{demand}$ reaches the lower limit value $Tq_{demand,min}$, preventing the torque demanded $Tq_{demand}$ from decreasing further. This means that the torque demanded $Tq_{demand}$ will assume a pattern more similar to the dynamic torque $Tq_{fw}$, so the curves of the torque demanded $Tq_{demand}$ and the dynamic torque $Tq_{fw}$ coincide relatively well in the diagram. As may be seen in FIG. 3, hardly any engine/motor speed fluctuations occur when the present invention is employed, resulting in substantially no power train oscillations.

It may also be noted that with the present invention maximum torque can be reached more quickly, at about 0.4 second, than previous known solutions at about 0.6 second.

As may be seen in FIG. 3, the torque demanded $Tq_{demand}$ stops, becomes "stuck", at a level $Tq_{demand,s}$ just above 0 Nm until the dynamic torque $Tq_{fw}$ increases in magnitude, since the torque demanded $Tq_{demand}$ is bounded by the upper limit value $Tq_{demand,max}$ During the time when the torque demanded $Tq_{demand}$ is stuck at $Tq_{demand,s}$ the play in the power train takes effect and immediately shows up in the dynamic torque $Tq_{fw}$, which then quickly increases $Tq_{demand,inc}$ in magnitude. This rapid increase also causes the upper limit value $Tq_{demand,max}$ to likewise increase rapidly. The result is a smooth play transition, since the torque demanded $Tq_{demand}$ is not allowed to assume high values before the play takes effect. The torque demanded $Tq_{demand}$ thus has, before the play takes effect, a value substantially corresponding to the aforesaid level $Tq_{demand,s}$ just above 0 Nm. This works in the opposite way when the acceleration control is released, i.e. when the accelerator pedal position reverts to a smaller value, as the play then takes effect in the other direction and the torque demanded $Tq_{demand}$ is bounded by the lower limit value $Tq_{demand,min}$. As may be seen in the diagram, the engine/motor speed curve is substantially free from oscillations when the present invention is employed in regulating the torque demanded $Tq_{demand}$.

FIG. 4 depicts the operating situation of changing gear in a previous known method for regulating the torque demanded $Tq_{demand}$ where there is substantially no change in accelerator pedal position during the gear change. The torque demanded $Tq_{demand}$ is here ramped down towards 0 Nm before the actual gearchange takes place. The torque demanded $Tq_{demand}$ is thereafter ramped back up to a relatively high level. It is clear that the torque demanded $Tq_{demand}$ and the dynamic torque $Tq_{fw}$ differ substantially during the gear change, which is reasonable, since the dynamic torque $Tq_{fw}$ at the time will always be relatively close to 0 Nm. It is however clear in the diagram that the torque demanded $Tq_{demand}$ and the dynamic torque $Tq_{fw}$ in the previous known method also differ substantially both during the ramping down and during the ramping up, since the dynamic torque $Tq_{fw}$ oscillates more than the torque demanded $Tq_{demand}$, in the previous known solutions. This means that the power train behaves like the non-rigid power train which it is, with consequent engine/motor speed fluctuation, i.e. with power train oscillations.

FIG. 5 illustrates a gear change where the present invention is employed and its function is activated in the torque upramping ("TIPIN") but not in the downramping. The accelerator pedal position remains substantially unchanged during the downramping and the actual gear change, but drops thereafter. The torque demanded $Tq_{demand}$ here falls towards 0 Nm, after which the actual gear change takes place.

Thereafter the torque demanded $Tq_{demand}$ is ramped back up to a relatively high level when the present invention is employed. It is clear that the torque demanded $Tq_{demand}$ and the dynamic torque $Tq_{fw}$ coincide well during the upramping. Employing the present invention during the upramping results in the torque demanded $Tq_{demand}$ being bounded by the upper limit value $Tq_{demand,max}$, which means that the magnitude of the difference between the torque demanded $Tq_{demand}$ and the dynamic torque $Tq_{fw}$ is limited so that the power train behaves as if it was substantially rigid, resulting in very few and only small engine/motor speed fluctuations.

In this embodiment maximum torque may here again be reached more quickly by employing the present invention, at about 0.5 second, than previous known solutions at about 1 second.

FIG. 6 illustrates an example of how a previous known method for regulating the torque demanded $Tq_{demand}$ is affected by errors in the vehicle's torque reporting. In this example a significant torque reporting error by 300 Nm occurs during a gear change. The control system therefore thinks here that the dynamic torque $Tq_{fw}$ is about 300 Nm instead of its actual value of about 0 Nm. As may be seen in the diagram, this misreporting results in large fluctuations in the dynamic torque $Tq_{fw}$, whereas the torque demanded $Tq_{demand}$ does not fluctuate similarly. The result is a large cumulative difference between the dynamic torque $Tq_{fw}$ and the torque demanded $Tq_{demand}$, with consequently large engine/motor speed fluctuations, as is clear from the diagram.

FIG. 7 illustrates how regulation of the torque demanded $Tq_{demand}$ according to the present invention is affected by the torque misreporting depicted in FIG. 6, in previous known methods. Here again the control system thinks that the dynamic torque $Tq_{fw}$ during the actual gear change is about 300 Nm instead of its actual value of about 0 Nm. This means that the upper limit value $Tq_{demand,max}$ according to the invention is above that value by an offset $Tq_{offset,max}$ e.g. 300+100=400 Nm. This limit results in regulation according to the present invention being relatively insensitive to torque misreporting, since a value fed back for the dynamic torque $Tq_{fw}$ is employed in the regulation. This may also be seen in the diagram, in which the engine/motor speed is substantially free from oscillations. Maximum torque may also be reached significantly more quickly by employing the present invention, at about 0.5 second, than previous known solutions at about 0.9 second.

FIG. 8 is a flowchart for a method according to an embodiment of the present invention.

As a first step 801 of the method the dynamic torque $Tq_{fw}(t-\Delta t)$ from the previous time $t-\Delta t$ is fed back at time t.

As a second step 802 of the method, a maximum permissible value $Tq_{demand,max}$ and/or a minimum permissible $Tq_{demand,min}$ for the torque demanded $Tq_{demand}$ are determined at a time t.

As described above, the maximum value $Tq_{demand,max}$ is here greater than the dynamic torque $Tq_{fw}(t-\Delta t)$ at the earlier time $t-\Delta t$ by an offset value $Tq_{offset,max}$, i.e. $Tq_{demand,max}(t)=Tq_{fw}(t-\Delta t)+Tq_{offset,max}$. The minimum value $Tq_{demand,min}$ may similarly have a value $Tq_{demand,min}$ which is less than the dynamic torque $Tq_{fw}(t-\Delta t)$ at the earlier time $t-\Delta t$ by an offset value $Tq_{offset,min}$, i.e. $Tq_{demand,min}(t)=Tq_{fw}(t-\Delta t)-Tq_{offset,min}$. As this relationship is between the maximum permissible value $Tq_{demand,max}$ and the minimum permissible value $Tq_{demand,min}$ for the torque demanded $Tq_{demand}$ at time t, the maximum value $Tq_{demand,max}$ and/or the minimum value $Tq_{demand,min}$ may then be used in conjunction with the feedback of the dynamic torque $Tq_{fw}(t-\Delta t)$ at the earlier time $t-\Delta t$ to determine the torque demanded $Tq_{demand}$ at time t.

As a third step 803 of the method, the difference between the torque demanded $Tq_{demand}$ and the dynamic torque $Tq_{fw}$ at time t is limited by using the dynamic torque $Tq_{fw}(t-\Delta t)$ fed back at the earlier time $t-\Delta t$.

The regulation of the torque demanded $Tq_{demand}$ at a time t may thus be continuously varied to the dynamic torque $Tq_{fw}$ and/or the dynamic wheel torque $Tq_{wheel}$ which is actually utilized by the vehicle at the earlier time $t-\Delta t$, in which case the feedback of the dynamic torque $Tq_{fw}$ causes information related to the dynamic torque $Tq_{fw}$ and/or the dynamic wheel torque $Tq_{wheel}$ to be fed back and taken into account in regulating the torque demanded $Tq_{demand}$. The power train oscillations may thus be minimized as described above.

One skilled in the art will appreciate that a method for regulating the torque $Tq_{demanded}$ according to the present invention may also be implemented in a computer program which, when executed in a computer, causes the computer to apply the method. The computer program usually takes the form of a computer program product 903 which comprises a suitable digital non-transitory storage medium on which the computer program is stored. Said computer-readable medium comprises a suitable memory, e.g. ROM (read-only memory), PROM (programmable read-only memory), EPROM (erasable PROM), flash memory, EEPROM (electrically erasable PROM), a hard disc unit, etc.

FIG. 9 depicts schematically a control unit 900 provided with a calculation unit 901 which may take the form of substantially any suitable type of processor or microcomputer, e.g. a circuit for digital signal processing (digital signal processor, DSP), or a circuit with a predetermined specific function (application specific integrated circuit, ASIC). The calculation unit 901 is connected to a memory unit 902 which is situated in the control unit 900 and which provides the calculation unit with, for example, the stored program code and/or the stored data which the calculation unit needs to enable it to do calculations. The calculation unit is also adapted to storing partial or final results of calculations in the memory unit 902.

The control unit 900 is further provided with respective devices 911, 912, 913, 914 for receiving and sending input and output signals. These input and output signals may comprise waveforms, pulses or other attributes which the input signal receiving devices 911, 913 can detect as information and which can be converted to signals which the calculation unit 901 can process. These signals are then supplied to the calculation unit. The output signal sending devices 912, 914 are adapted to converting calculation results from the calculation unit 902 to output signals for conveying to other parts of the vehicle's control system and/or the component or components for which the signals are intended, e.g. the prime mover.

Each of the connections to the respective devices for receiving and sending input and output signals may take the form of one or more from among a cable, a data bus, e.g. a CAN (controller area network) bus, a MOST (media orientated systems transport) bus or some other bus configuration, or a wireless connection.

One skilled in the art will appreciate that the aforesaid computer may take the form of the calculation unit 901 and that the aforesaid memory may take the form of the memory unit 902.

Control systems in modern vehicles generally comprise a communication bus system consisting of one or more communication buses for connecting a number of electronic control units (ECUs), or controllers, to various components on board the vehicle. Such a control system may comprise a large number of control units and taking care of a specific function may be divided between two or more of them. Vehicles of the type here concerned are therefore often provided with significantly more control units than depicted in FIG. 9, as one skilled in the art will surely appreciate.

In the embodiment depicted, the present invention is implemented in the control unit 900 but might also be implemented wholly or partly in one or more other control units with which the vehicle is already provided or in a control unit dedicated to the present invention.

One aspect of the present invention proposes a system for regulation of torque demanded from a prime mover 101 of a vehicle 100, $Tq_{demand}$, which prime mover 101 is adapted to delivering a dynamic torque $Tq_{fw}$ in response to the torque demanded $Tq_{demand}$. This dynamic torque $Tq_{fw}$ is related by a gear ratio i to a dynamic wheel torque $Tq_{wheel}$ which a power train comprising the prime mover 101 is adapted to imparting to at least one of the vehicle's tractive wheel 110, 111. According to the present invention the system is adapted to conducting the regulation of the torque demanded $Tq_{demand}$ in such a way that a difference between the torque demanded $Tq_{demand}$ and the dynamic torque $Tq_{fw}$ is actively limited by employing feedback of the dynamic torque $Tq_{fw}(t-\Delta t)$ at an earlier time $t-\Delta t$. The torque demanded $Tq_{demand}$ at a time t for the regulation is here limited to a maximum value $Tq_{demand,max}$ which exceeds the dynamic torque $Tq_{fw}(t-\Delta t)$ at an earlier time $t-\Delta t$ by an offset value $Tq_{offset,max}$, i.e. $Tq_{demand,max}(t)=Tq_{fw}(t-\Delta t)+tq_{offset,max}$. The torque demanded $Tq_{demand}$ is thus continuously varied according to the dynamic torque $Tq_{fw}$.

One skilled in the art will also appreciate that the above system may be modified according to the various embodiments of the method according to the invention. The invention relates also to a motor vehicle 100, e.g. a car, a truck or a bus, provided with at least one system for regulation of torque demanded $Tq_{demand}$ according to the invention.

The present invention is not restricted to its embodiments described above but relates to and comprises all embodiments within the protective scope of the attached independent claims.

The invention claimed is:

1. A method in a vehicle for regulation of torque demanded from a prime mover which responds to said torque demanded by delivering to its output shaft a dynamic torque which is related by a gear ratio to a dynamic wheel torque imparted by a power train comprising said prime mover to at least one tractive wheel of said vehicle, wherein said regulation of said torque demanded is conducted such that a difference between said torque demanded and said dynamic torque is actively limited by employing feedback of said dynamic torque at an earlier time, said torque demanded at a time (t) for said regulation being limited to a maximum value which exceeds said dynamic torque at an earlier time by an offset value, said torque demanded being continuously varied according to said dynamic torque.

2. A method according to claim 1, in which said dynamic torque corresponds to said torque demanded minus a rotational inertia of said prime mover multiplied by a rotational acceleration of said prime mover.

3. A method according to claim 1, in which
a rotational inertia of said prime mover dominates a total rotational inertia of said power train, and
said dynamic wheel torque corresponds to said dynamic torque multiplied by said gear ratio.

4. A method according to claim 1, in which said difference between said torque demanded and said dynamic torque is employed in a sign-neutral summation over time of said difference in determining a first measurement of said regulation of said torque demanded, which regulation of said torque demanded employs said first measurement, and a smaller value arrived at in said summation represents a more successful regulation.

5. A method according to claim 4, in which said sign-neutral summation comprises an absolute amount summation and/or a square summation over time of said difference.

6. A method according to claim 1, in which said torque demanded at a time (t) for said regulation is limited to a minimum value which is less than said dynamic torque at an earlier time by a minimum offset value.

7. A method according to claim 6, in which a magnitude of said minimum offset value is constant.

8. A method according to claim 6, in which a magnitude of said minimum offset value is variable and is related to a behavior of said vehicle.

9. A method according to claim 6, in which said magnitude of said minimum offset value is determined on the basis of a chosen operating mode for said vehicle.

10. A method according to claim 1, in which a magnitude of said offset value is constant.

11. A method according to claim 1, in which a magnitude of said offset value is variable and is related to a behavior of said vehicle.

12. A method according to claim 11, in which said magnitude of said offset value is determined on the basis of a chosen operating mode for said vehicle.

13. A method according to claim 1, in which said dynamic torque at said earlier time comprises information related to a magnitude of said dynamic wheel torque at said earlier time.

14. A method according to claim 1, in which said dynamic torque at said earlier time is determined on the basis of said torque demanded at said earlier time,
minus a rotational inertia of said prime mover, multiplied by a rotational acceleration at said earlier time for said prime mover, where the rotational acceleration is measured.

15. A method according to claim 1, in which a change time which effecting a predetermined change in said dynamic torque takes is employed in determining a second measurement of said regulation of said torque demanded, and a shorter change time represents a more successful regulation.

16. A method according to claim 15, in which said regulation of said torque demanded is conducted in such that said second measurement is minimized.

17. A method according to claim 1, in which said regulation is employed in order to reduce power train oscillations in one or more of the following situations:
a commencement of demand for torque from said prime mover,
a cessation of demand for torque from said prime mover,
play in said power train,
activation of a clutch in said power train,
a gear change in a gearbox in said power train,
misreporting of a driving torque at the time of a gear change in a gearbox in said power train, and
power train oscillations caused by external factors.

18. A computer program product located on a non-transitory computer readable medium, where the program product is used in a vehicle for regulation of torque demanded from a prime mover which responds to said torque demanded by delivering to its output shaft a dynamic torque which is related by a gear ratio to a dynamic wheel torque imparted by a power train comprising said prime mover to at least one tractive wheel of said vehicle, wherein said computer program product comprises instructions for operation by a computing device to cause regulation of said torque demanded conducted such that a difference between said torque demanded and said dynamic torque is actively limited by employing feedback of said dynamic torque at an earlier time, said torque demanded at a time (t) for said regulation being limited to a maximum value which exceeds said dynamic torque at an earlier time by an offset value, said torque demanded being continuously varied according to said dynamic torque.

19. A system for regulation of torque demanded from a prime mover of a vehicle, which prime mover is adapted to respond to said torque demanded by delivering to an output shaft a dynamic torque which is related by a gear ratio to a dynamic wheel torque which a power train comprising said prime mover is adapted to impart to at least one tractive wheel of said vehicle, wherein said system is adapted to conducting said regulation of said torque demanded such that a difference between said torque demanded and said dynamic torque is actively limited by employing feedback of said dynamic torque at an earlier time, said torque demanded at a time (t) for said regulation being limited to a maximum value which exceeds said dynamic torque at an earlier time by an offset value, said torque demanded being continuously varied according to said dynamic torque.

* * * * *

UNITED STATES PATENT AND TRADEMARK OFFICE
CERTIFICATE OF CORRECTION

| | |
|---|---|
| PATENT NO. | : 9,878,720 B2 |
| APPLICATION NO. | : 14/761903 |
| DATED | : January 30, 2018 |
| INVENTOR(S) | : Johan Tunhag, Niclas Lerede and Martin Evaldsson |

Page 1 of 1

It is certified that error appears in the above-identified patent and that said Letters Patent is hereby corrected as shown below:

On the Title Page

Item [22] should read as follows:
-- February 3, 2014 --

Signed and Sealed this
Twenty-second Day of May, 2018

Andrei Iancu
*Director of the United States Patent and Trademark Office*